Patented Oct. 20, 1931

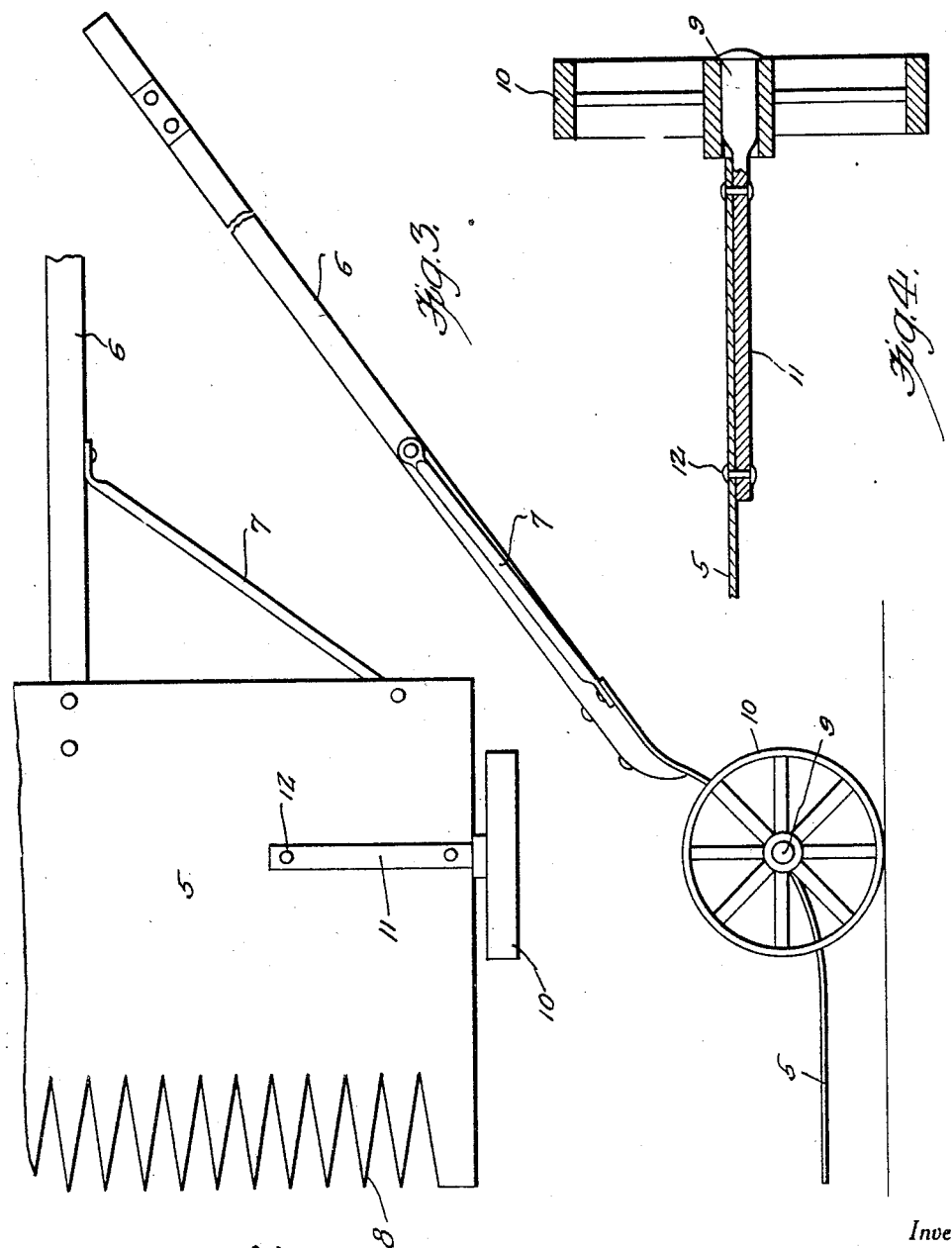

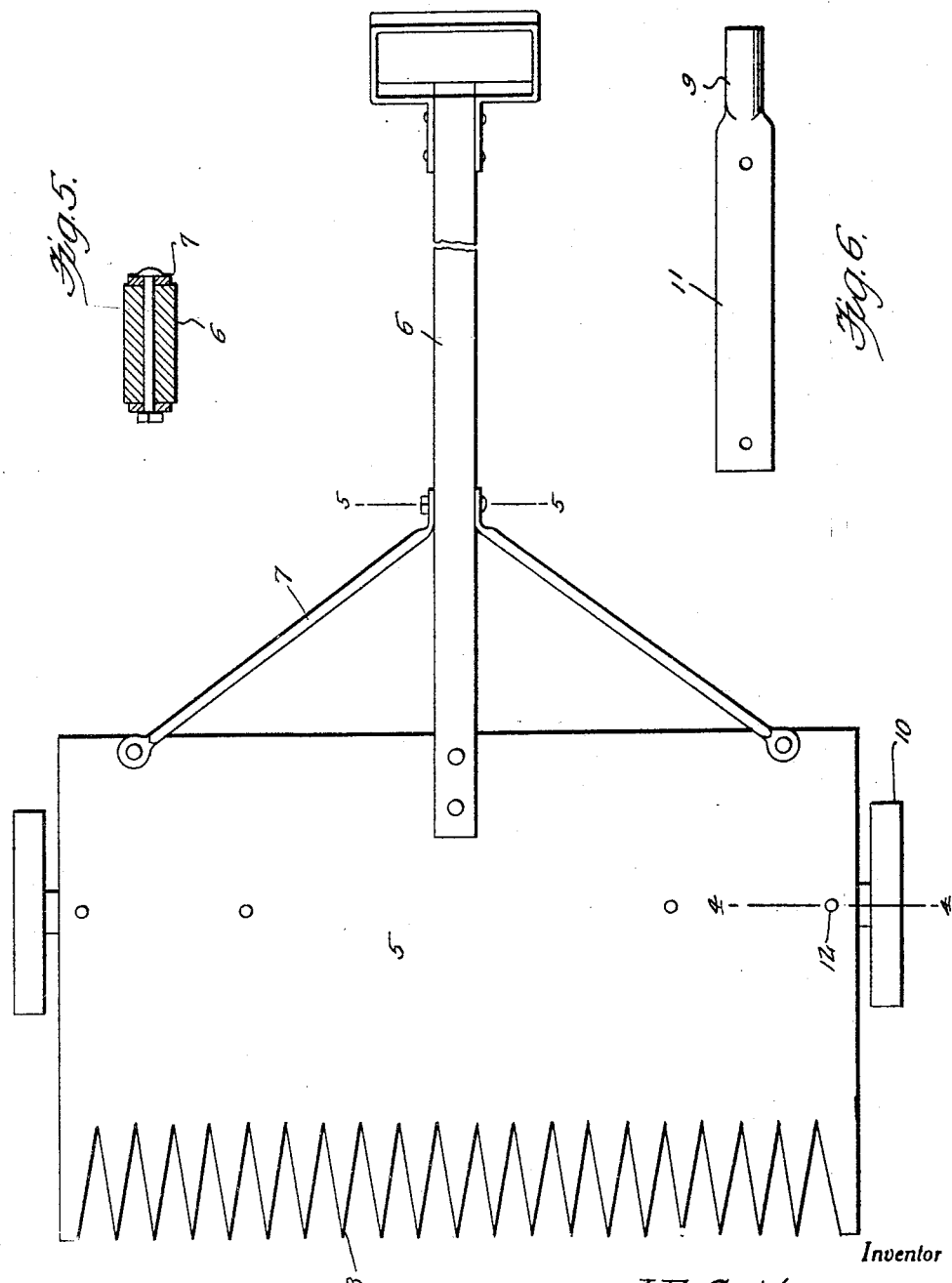

1,828,129

UNITED STATES PATENT OFFICE

JOHN E. CRITZ, OF IOWA CITY, IOWA

DANDELION CUTTER

Application filed May 31, 1930. Serial No. 458,290.

The present invention relates to a dandelion cutter and has for its prime object to provide a wheeled implement for removing the heads of dandelions thereby preventing the plant from seeding and thus exterminating.

Another very important object of the invention resides in the provision of a dandelion cutter of this nature which consists of a sharp flat blade with a sharp toothed edge coupled to a handle and mounted on wheels.

A still further very important object of the invention resides in the provision of a device of this nature which is exceedingly simple in its construction, inexpensive to manufacture, strong and durable, easy to operate, and otherwise well adapted to the purpose for which it is designed.

With the above and numerous other objects in view as will appear as the description proceeds, the invention resides in certain novel features of construction, and in the combination and arragement of parts as will be hereinafter more fully described and claimed.

In the drawings:

Figure 1 is a top plan view of the device embodying the features of my invention, Figure 2 is a fragmentary bottom plan view thereof showing one side, Figure 3 is a side elevation of the device, Figure 4 is a detail sectional view taken substantially on the line 4—4 of Figure 1, Figure 5 is an enlarged detail section taken substantially on the line 5—5 of Figure 1, and Figure 6 is a plan view of one of the axles.

Referring to the drawing in detail it will be seen that the numeral 5 denotes a rectangular plate which forms the blade and body of the device. This rectangular plate is curved at its rear transversely and upwardly and has attached to its rear portion an elongated handle 6 braced with respect to the plate as at 7.

The front longitudinal edge of plate 5 is sharpened and toothed as is indicated at 8 so that the dandelions are receivable in the crotches between the teeth to be severed from their stems and deposited on top of the blade or plate.

Numerals 9 denote a pair of axles on which are journalled wheels 10. These axles 9 are provided with elongated flat extensions 11 at their inner ends riveted as at 12 under the side portions of the plate 5.

From the above detailed description it will be seen that I have devised a wheeled implement which may be pushed along a lawn or the like to sever the heads of dandelions from their stems and gather them on the blade plate.

It is thought that the construction, utility and advantages of this invention will now be quite apparent without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts as will be hereinafter more fully described and claimed, may be resorted to without departing from the spirit or scope of the invention as hereinafter claimed.

Having thus described my invention, what I claim as new is:

A dandelion cutter comprising a plate having its front edge formed with V-shaped notches to provide V-shaped teeth, said plate having its front part horizontally arranged and its rear part curving upwardly and rearwardly, a handle connected to the rear edge of the plate, an axle forming bar connected to each side part of the plate, and projecting therefrom, a wheel on each bar at the projecting end thereof, said axle forming bars being connected to the plate a slight distance from the point where the plate begins to curve upwardly with said part of the plate to which the handle is connected extending well beyond the parts to which the axle bars are connected.

In testimony whereof I affix my signature.

JOHN E. CRITZ.